(12) United States Patent　(10) Patent No.: US 11,256,771 B2
Suzuki　(45) Date of Patent: Feb. 22, 2022

(54) ELECTRONIC FILE DISPLAY SYSTEM

(71) Applicant: CANON KABUSHIKI KAISHA, Tokyo (JP)

(72) Inventor: Ryousuke Suzuki, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/847,592

(22) Filed: Dec. 19, 2017

(65) Prior Publication Data

US 2018/0107756 A1　Apr. 19, 2018

Related U.S. Application Data

(63) Continuation of application No. 13/603,792, filed on Sep. 5, 2012, now abandoned.

(30) Foreign Application Priority Data

Sep. 8, 2011　(JP) .................................. 2011-196142

(51) Int. Cl.
　　*G06F 17/00*　(2019.01)
　　*G06F 16/955*　(2019.01)

(52) U.S. Cl.
　　CPC ................................ *G06F 16/9554* (2019.01)

(58) Field of Classification Search
　　None
　　See application file for complete search history.

(56) References Cited

U.S. PATENT DOCUMENTS

| | | | | |
|---|---|---|---|---|
| 7,314,178 B2* | 1/2008 | Rines | .................. | G06F 16/9554 235/472.01 |
| 8,812,651 B1* | 8/2014 | Eriksen | ................. | H04L 45/745 709/224 |
| 2007/0070398 A1* | 3/2007 | Oshima | .............. | H04N 1/00222 358/1.15 |
| 2007/0288589 A1* | 12/2007 | Chen | ................... | G06F 16/9574 709/217 |
| 2009/0204663 A1* | 8/2009 | Patwari | .............. | H04N 7/17318 709/203 |
| 2010/0318892 A1* | 12/2010 | Teevan | ................. | G06F 17/2205 715/229 |
| 2011/0085196 A1* | 4/2011 | Liu | ........................ | G06F 3/1204 358/1.15 |
| 2011/0252311 A1* | 10/2011 | Kay | ...................... | G06F 40/174 715/255 |

(Continued)

FOREIGN PATENT DOCUMENTS

| | | |
|---|---|---|
| JP | 2006-125871 A | 5/2006 |
| JP | 2007-193603 A | 8/2007 |
| WO | 2011/099403 A1 | 8/2011 |

*Primary Examiner* — Mustafa A Amin

(74) *Attorney, Agent, or Firm* — Canon U.S.A., Inc. IP Division

(57) ABSTRACT

A display device notifies a server device of identification information for specifying an electronic file to be displayed. The server device specifies the electronic file and page information based on the notified identification information to transmit the electronic file and the page information to the display device. The display device displays, as an initial screen, a specified page of the received electronic file based on the received electronic file and page information.

14 Claims, 13 Drawing Sheets

(56) References Cited

U.S. PATENT DOCUMENTS

| | | | | |
|---|---|---|---|---|
| 2012/0069371 A1* | 3/2012 | Fujii | .................... | G06F 3/1208 |
| | | | | 358/1.13 |
| 2012/0131416 A1* | 5/2012 | Dugan | ................... | G06F 11/32 |
| | | | | 714/760 |
| 2012/0206498 A1* | 8/2012 | Kai | ...................... | G06F 3/0482 |
| | | | | 345/684 |
| 2012/0266103 A1* | 10/2012 | Shah | ............................ | 715/784 |
| 2012/0317480 A1* | 12/2012 | Onishi | .............. | H04N 1/00344 |
| | | | | 715/273 |
| 2016/0314543 A1* | 10/2016 | Krish | .................... | G06Q 50/04 |

* cited by examiner

600 TABLE

| OPERATION SCREEN | IDENTIFICATION INFORMATION |
|---|---|
| MENU SCREEN | A-001 |
| COPY SCREEN | A-002 |
| FAX SCREEN | A-003 |
| SEND SCREEN | A-004 |
| ERROR (JAM) SCREEN | A-005 |
| ERROR (NO PAPER) SCREEN | A-006 |

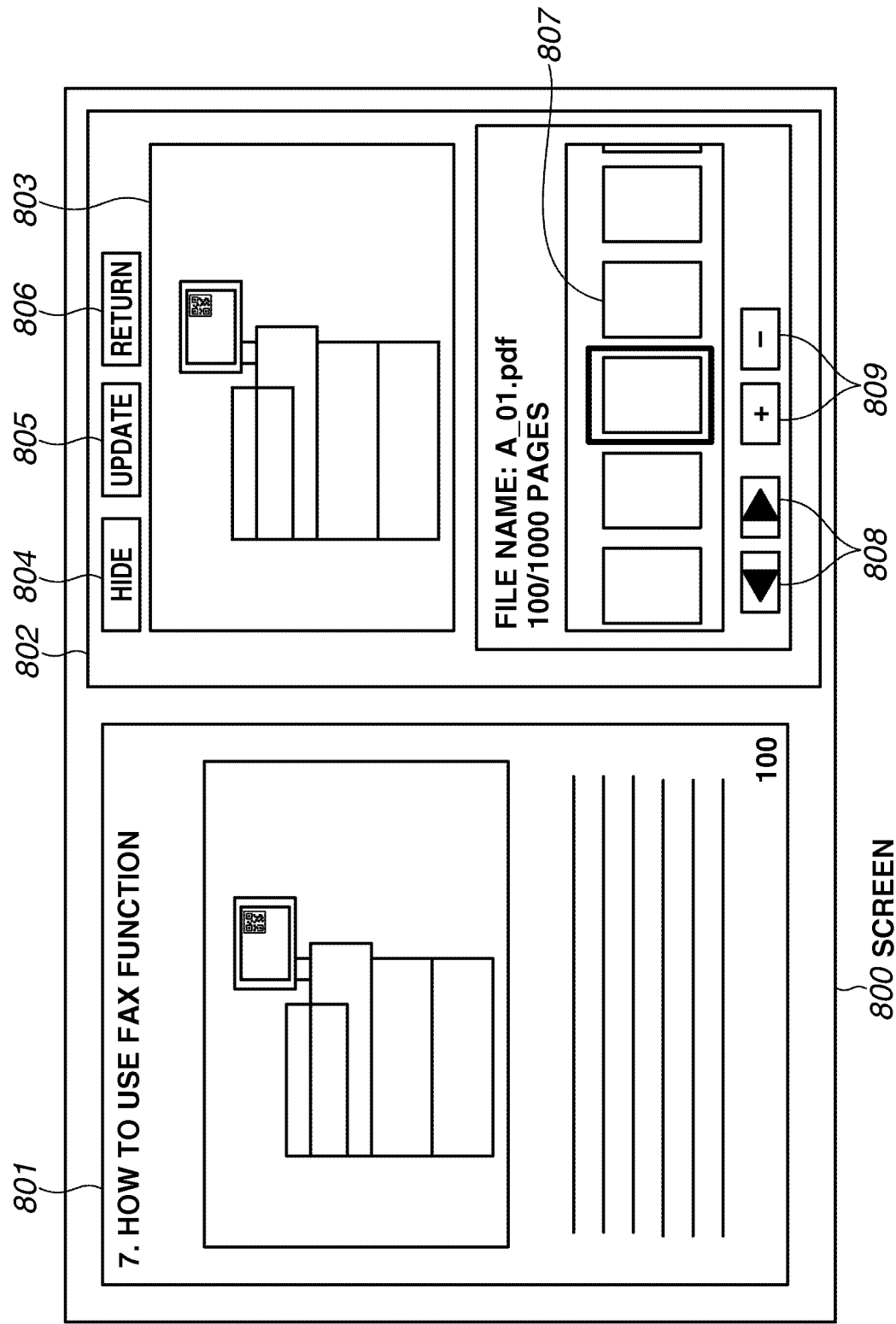

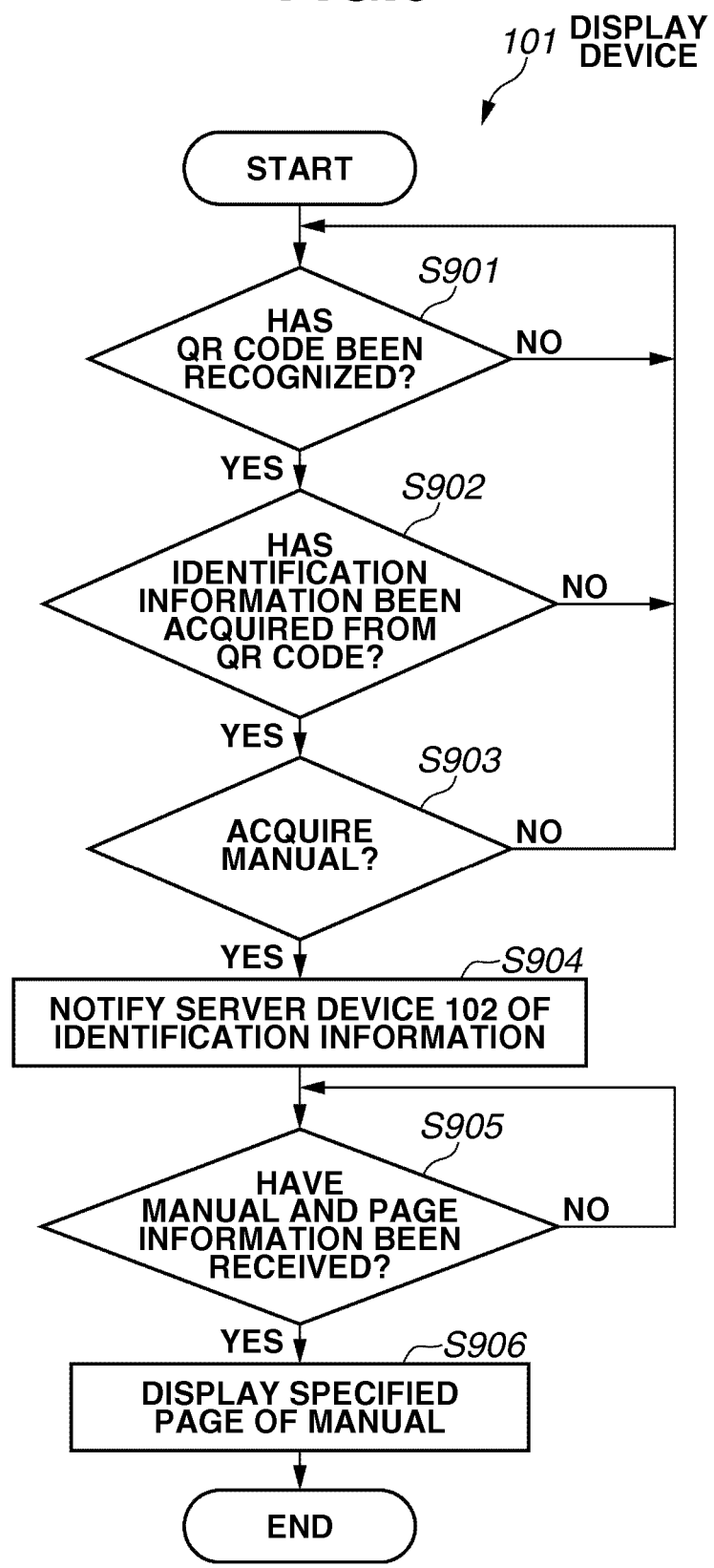

FIG.11

*1100* TABLE

| IDENTIFICATION INFORMATION | MANUAL | PAGE INFORMATION |
|---|---|---|
| A-001 | A_01.pdf | 5 |
| A-002 | A_01.pdf | 20 |
| A-003 | A_01.pdf | 100 |
| A-004 | A_01.pdf | 200 |
| A-005 | A_02.pdf | 5 |
| A-006 | A_02.pdf | 15 |
| B-001 | B_01.pdf | 5 |
| B-002 | B_01.pdf | 10 |

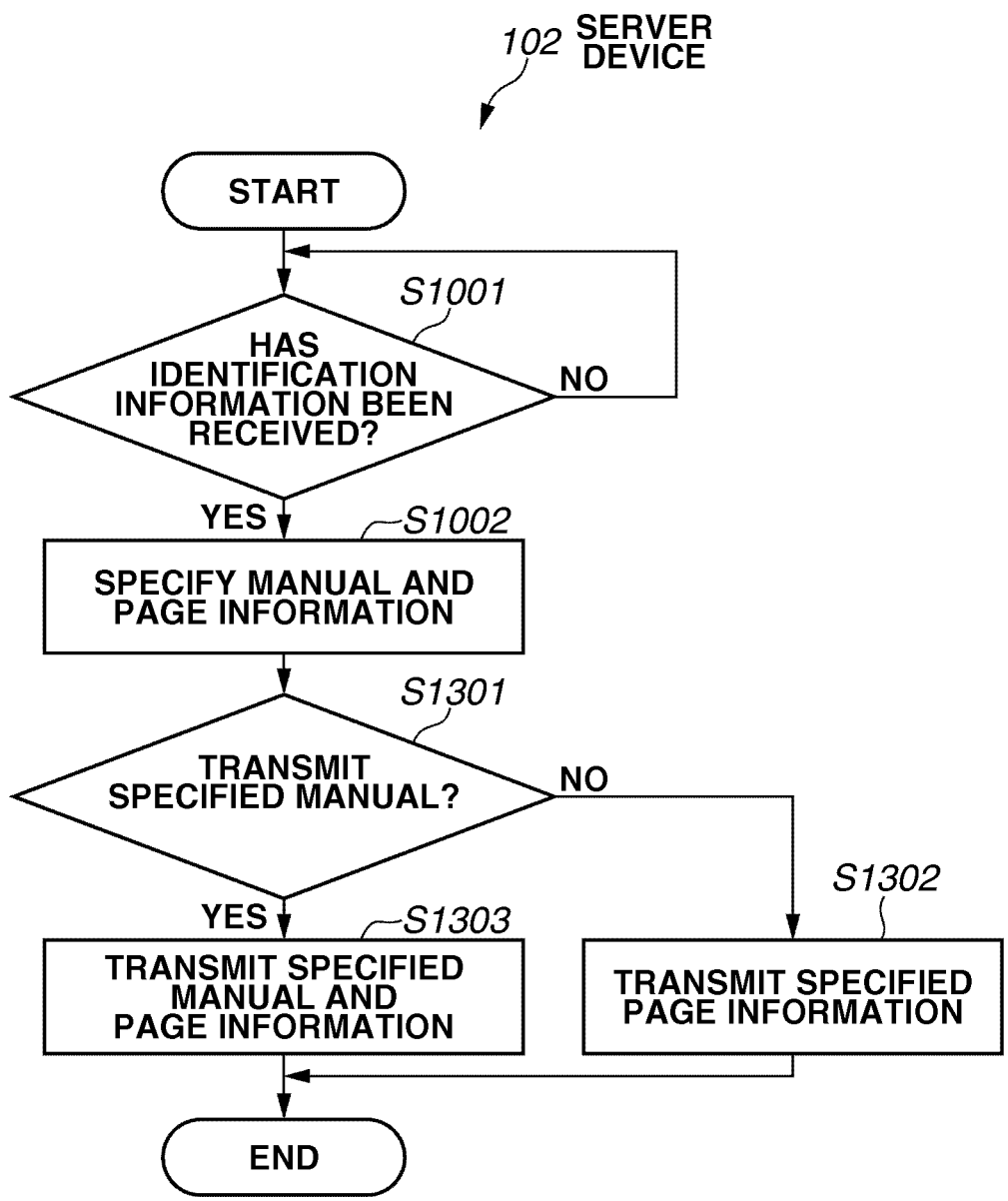

ELECTRONIC FILE DISPLAY SYSTEM

CROSS-REFERENCE TO RELATED APPLICATION

This application is a Continuation of U.S. application Ser. No. 13/603,792, filed Sep. 5, 2012, which claims priority from Japanese Patent Application No. 2011-196142 filed Sep. 8, 2011, which are hereby incorporated by reference herein in their entireties.

BACKGROUND OF THE INVENTION

Field of the Invention

The present invention relates to an electronic file display system.

Description of the Related Art

Conventionally, manuals of information processing apparatuses such as a personal computer (PC) and a multifunction peripheral (MFP) have been opened to users as electronic files. For example, Japanese Patent Application Laid-Open No. 2007-193603 discusses a configuration in which an information processing apparatus is provided with a QR code (registered trademark) for specifying a type of the information processing apparatus, and a mobile phone reads the QR code to acquire a manual corresponding to the type thereof, to browse the manual via the mobile phone. Therefore, by using a technique discussed in Japanese Patent Application Laid-Open No. 2007-193603, the manual corresponding to the information processing apparatus can be easily acquired. As described above, according to Japanese Patent Application Laid-Open No. 2007-193603, the electronic file (e.g., manual) corresponding to the information processing apparatus can be easily acquired, however, a user takes much time for searching a desired page in the electronic file.

SUMMARY OF THE INVENTION

The present invention is directed to acquiring an electronic file easily and, in addition, decreasing time for searching a page desired by user.

According to an aspect of the present invention, an electronic file display system including an information processing apparatus and an electronic file display device displaying an electronic file, wherein the information processing apparatus includes a first display unit configured to display an operation screen and a code image corresponding to the operation screen, and the electronic file display device includes a first acquisition unit configured to acquire, from the code image, identification information for specifying the electronic file to be displayed by the electronic file display device, a second acquisition unit configured, based on the identification information acquired by the first acquisition unit, to acquire the electronic file and page information for specifying a specific page of the electronic file to be displayed by the electronic file display device, and a second display unit configured, based on the page information, to display the specific page in the electronic file acquired by the second acquisition unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 8 is an example illustrating a method for displaying an electronic file according to the first exemplary embodiment of the present invention.

FIG. 9 is a flowchart illustrating processing performed by the display device according to the first exemplary embodiment of the present invention.

FIG. 11 illustrates a configuration of a table according to the first exemplary embodiment of the present invention.

FIG. 13 is a flowchart illustrating processing performed by a server device according to the second exemplary embodiment of the present invention.

DESCRIPTION OF THE EMBODIMENTS

Various exemplary embodiments, features, and aspects of the invention will be described in detail below with reference to the drawings.

Exemplary embodiments described herebelow do not limit the invention according to a scope of patent claims, and further all combinations of characteristics described in the exemplary embodiments are not always essential for means for solving problems of the invention.

Figure 1:
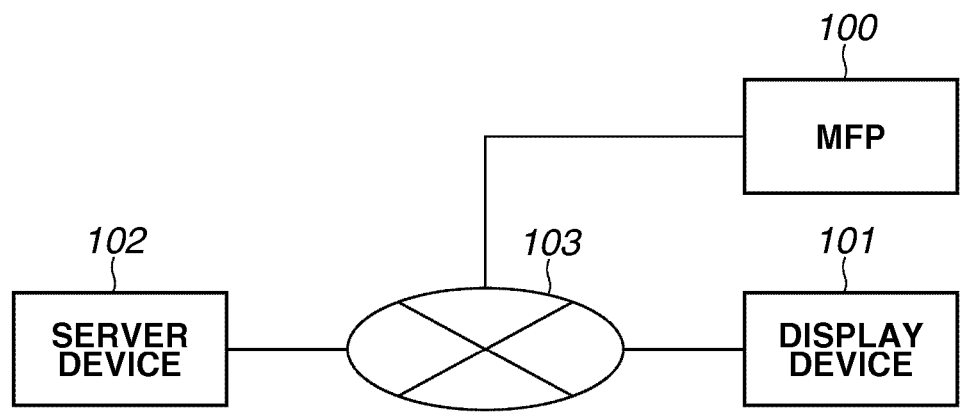
FIG. 1 illustrates an entire electronic file display system according to a first exemplary embodiment of the present invention.

A first exemplary embodiment will be described. FIG. 1 illustrates an electronic file display system according to the present exemplary embodiment. An MFP 100 includes a display such as a liquid crystal display (LCD) and an operation unit, and executes processing of printing, copying, and storing a read original document according to a user's instruction via the operation unit and a command input from an external device (not illustrated). The read original document is the image of the original document after the original document is read (i.e., scanned). Further, the MFP will be described as an example of the information processing apparatus, however, the information processing apparatus according to the present invention is not limited thereto and may be a PC or a single function peripheral (SFP) such as a scanner and a printer.

A display device 101 includes a display such as the LCD and a camera using a charge coupled device (CCD), and an electronic file (e.g., manual of MFP 100) is displayed on a display of the display device 101. The display device 101 includes a tablet terminal. A server device 102 stores the electronic file such as a manual, and is communicably connected with the display device 101 and the MFP 100 via a network 103. The network 103 is not specifically limited in its configuration, but can have various types of configurations, for example, a local area network (LAN), an internet, and a wireless communication.

Figure 2:
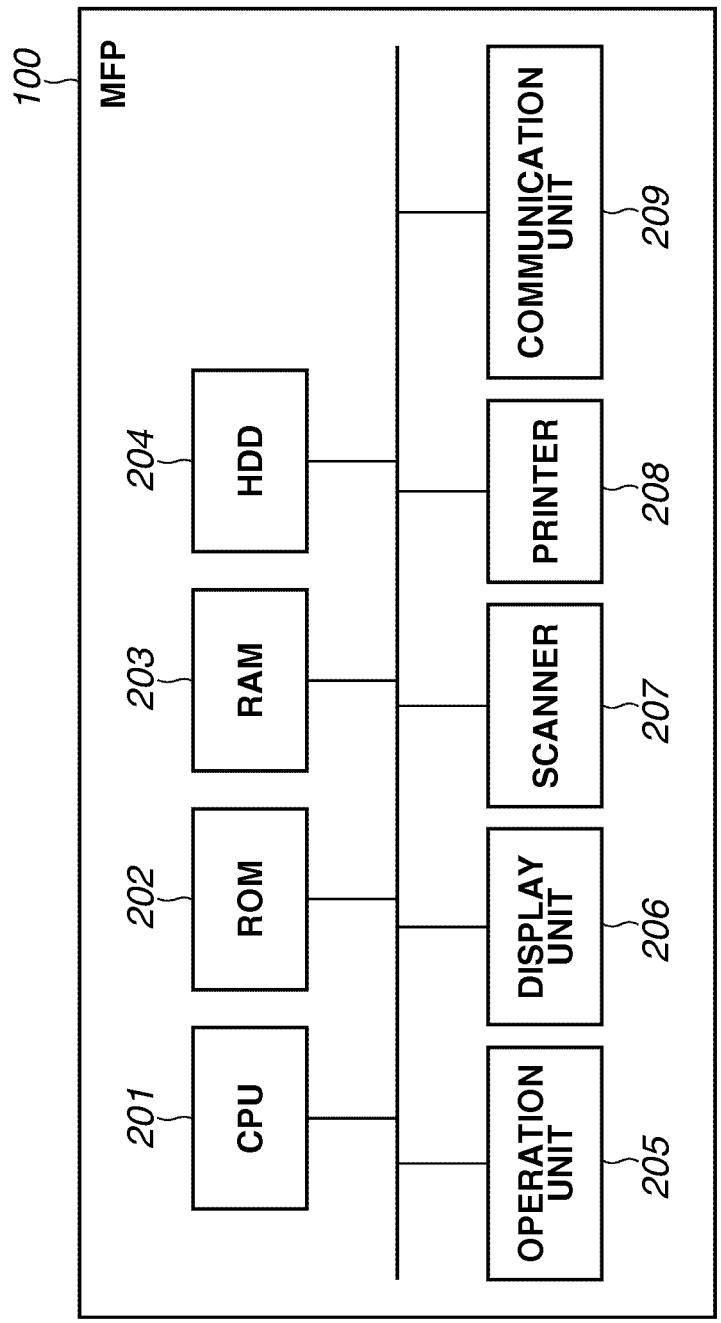
FIG. 2 illustrates a configuration of an MFP according to the first exemplary embodiment of the present invention.

FIG. 2 illustrates a configuration of the MFP 100. A central processing unit (CPU) 201 reads a control program stored in a read only memory (ROM) 202 and a hard disk (HDD) 204 to control the overall MFP 100. The ROM 202 stores information about the control program for example. A random access memory (RAM) 203 is used as a main memory of the CPU 201 and a temporary storage region of a work area. Similarly to the ROM 202, the HDD 204 stores the information about the control program for example.

An operation unit 205 includes a keyboard and transmits information input by the user to the CPU 201. A display unit 206 displays an operation screen and an error screen of the MFP 100. According to the present exemplary embodiment, the operation unit 205 and the display unit 206 are described as being separately configured, however, they may be integrally configured for example, as a liquid crystal panels having a touch-panel function.

A scanner 207 reads the original document to generate image data. A printer 208 performs print processing on a sheet based on the user's instruction input via the operation unit 205 and the command input from the external device via a communication unit 209. The communication unit 209 communicates with the external device (not illustrated).

Figure 3:
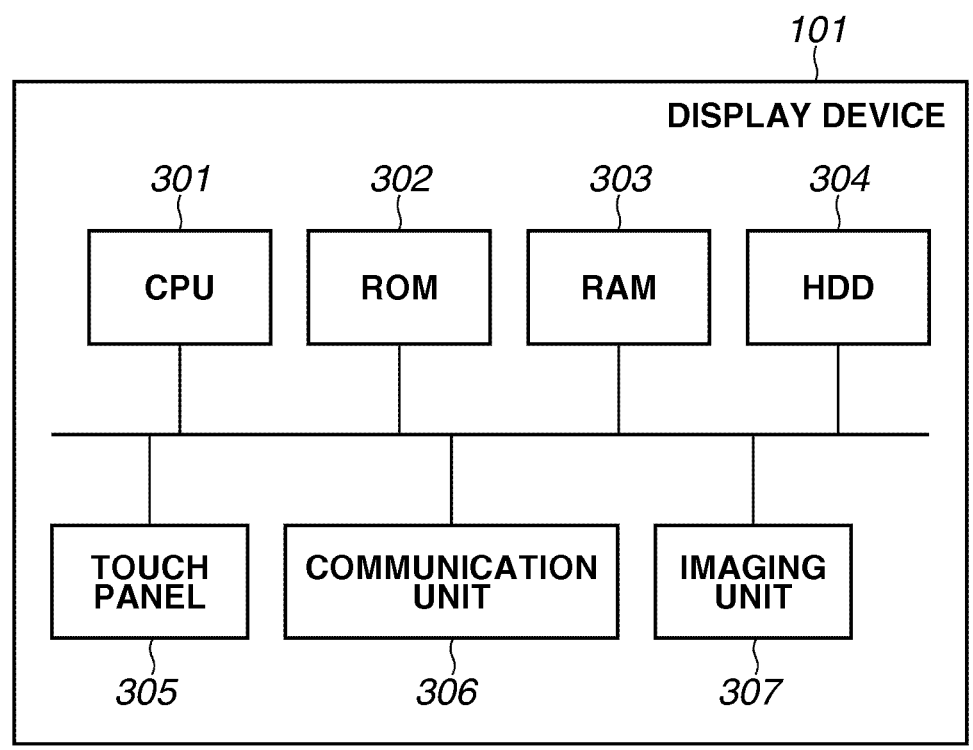
FIG. 3 illustrates a configuration of a display device according to the first exemplary embodiment of the present invention.

FIG. 3 illustrates a configuration of the display device 101. A CPU 301 reads the control program stored in a ROM 302 and a HDD 304 to control the overall display device 101. The ROM 302 stores the information about the control program for executing processing according to each flowchart described below, for example. A RAM 303 is used as the main memory of the CPU 301 and the temporary storage region of the work area. Similarly to the ROM 302, an HDD 304 stores the information about the control program for executing the processing according to each flowchart described below for example.

A touch panel 305 is the liquid crystal panel having the touch-panel function and displays the operation screen. More specifically, the touch panel 305 can display the electronic file (e.g., manual of MFP 100) and also display the image captured by an imaging unit 307. Further, the information input by the user via the touch panel 305 can be transmitted to the CPU 301.

A communication unit 306 communicates with the server device 102 via the network 103, and also communicates with the external device such as the MFP 100 via the wireless communication.

An imaging unit 307 is a CCD camera for example, and an image captured by the imaging unit 307 is displayed on the touch panel 305. Further, the imaging unit 307 reads a code image such as a QR code and analyzes the read code image, to acquire information included in the code image.

In the present exemplary embodiment, the display of the operation screen and the input by the user are performed via the touch panel 305, however the configuration of the display device 101 is not limited thereto. As another configuration, for example, the display unit and the operation unit may be provided in addition to the touch panel 305, or the operation unit in addition to the touch panel 305 may be secondarily provided.

Figure 4:
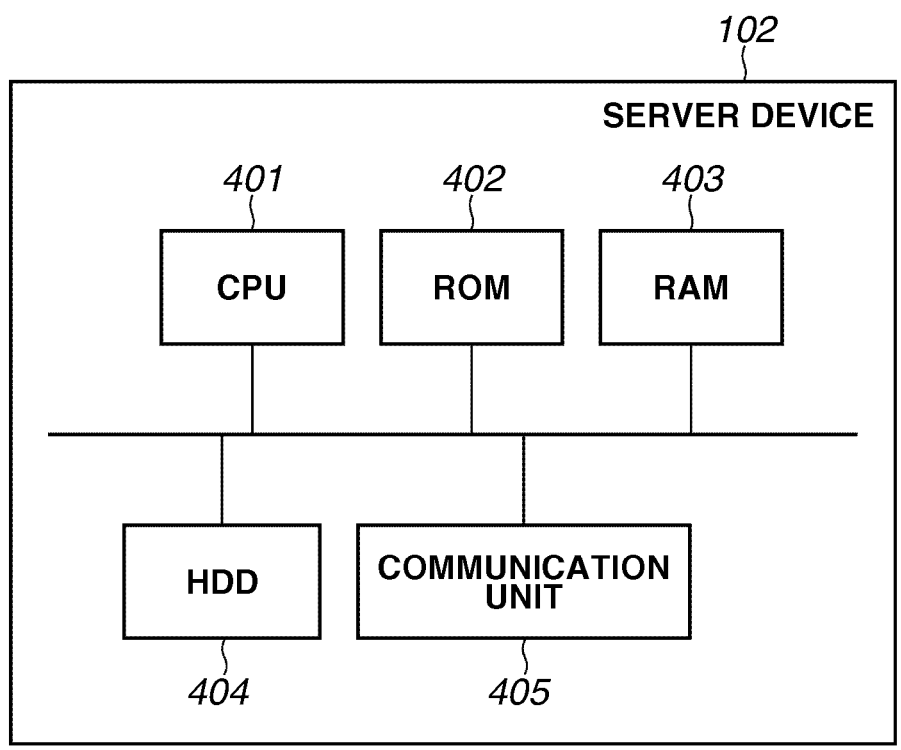
FIG. 4 illustrates a configuration of a server device according to the first exemplary embodiment of the present invention.

FIG. 4 illustrates a configuration of the server device 102. A CPU 401 reads the control program stored in a ROM 402 and an HDD 404 to control the overall server device 102. The ROM 402 stores the information about the control program for executing processing according to each flowchart described below for example. A RAM 403 is used as the main memory of the CPU 401 and the temporary storage region of the work area. Similarly to the ROM 402, the HDD 404 stores the information about the control program for executing the processing according to each flowchart described below for example. Further, as the electronic file, the HDD 404 stores the manuals of various models of the MFPs including the MFP 100.

A communication unit 405 communicates with the display device 101 via the network 103, and also communicate with the external device such as the MFP 100 via the wireless communication.

Figure 5:
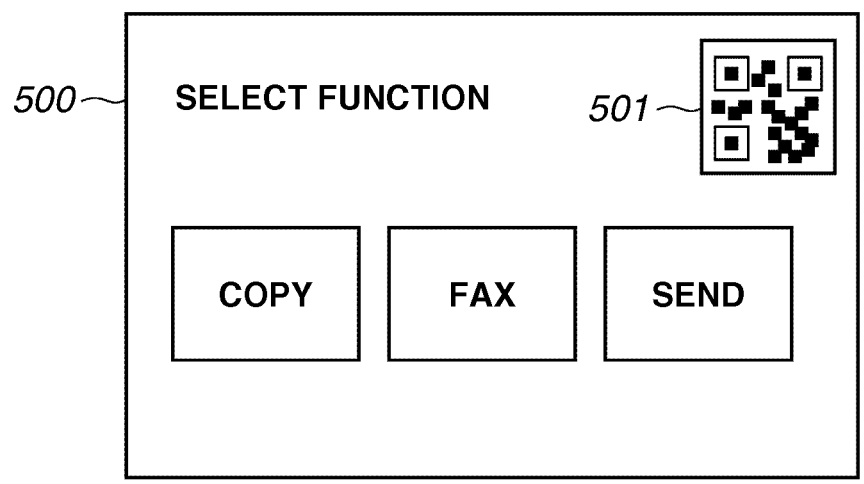
FIG. 5 is an example illustrating an operation screen of the MFP according to the first exemplary embodiment of the present invention.

FIG. 5 is an example illustrating the operation screen displayed on the display unit 206 of the MFP 100. An operation screen 500 is a menu screen, which displays buttons to use the functions provided by the MFP. The operation screen 500 displays, as functions which the user can use, a copy function, a fax function and a transmission function (function of transmitting image data generated by reading the original with the scanner 207 to a specified address). When the user presses any button, the operation screen 500 for using the function corresponding to the button is displayed on the display unit 206.

The operation screen 500 displays a code image 501. For example, the QR code is used for the code image 501, the present invention is not limited thereto and a bar code may be used for example. The code image 501 includes identification information for specifying the type of the operation screen displayed via the display unit 206. Further, the information included in the code image 501 is not limited to the identification information for specifying the type of the operation screen, and may further include information specifying the model of the MFP 100 and information for specifying the server device 102. The identification information will be described in detail in FIG. 6.

Figure 6:
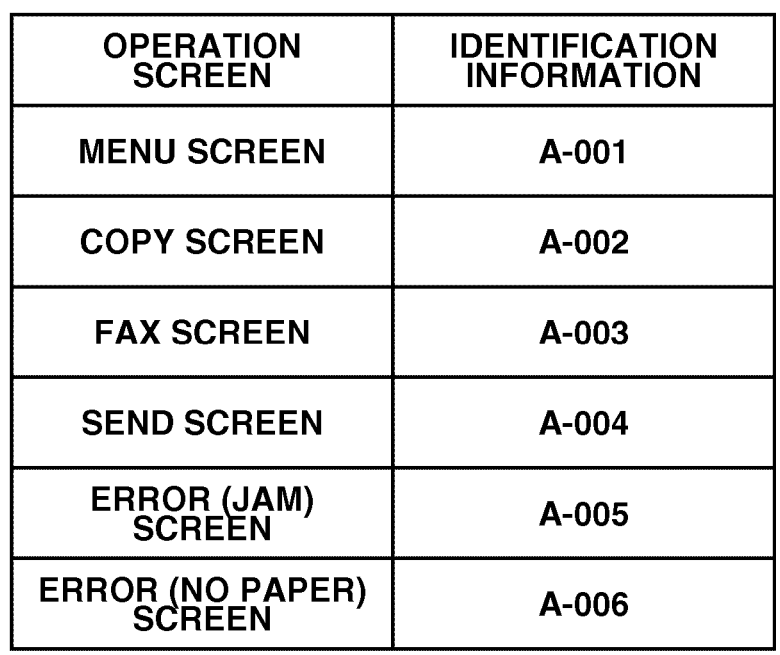
FIG. 6 illustrates a configuration of a table according to the first exemplary embodiment of the present invention.

FIG. 6 illustrates a table 600 stored in the HDD 204 of the MFP 100. In a table 600, the operation screens to be displayed on the display unit 206 are each associated with the identification information for specifying the types of the operation screens. The operation screen is associated with the identification information, for example, the menu screen corresponds to "A-001", a copy screen corresponds to "A-002", and an error (jam) screen corresponds to "A-005". In addition to the operation screens indicated in the table 600, the MFP 100 can also associate the identification information with various types of operation screens corresponding to other errors that are not indicated in the table 600 and states of the MFP 100 for other functions that can be executed by the MFP 100, and store them.

Once the operation screen is displayed on the display unit 206, the MFP 100 generates the code image indicating the identification information corresponding to the operation screen, and then displays the code image generated as illustrated in FIG. 5 together with the operation screen. The present exemplary embodiment describes that the MFP 100 generates the code image, but it is not limited thereto. As another embodiment, for example, screen information for displaying the operation screen may include information for displaying the code image.

A method for browsing the manual of the MFP 100 using the display device 101 will be described, with reference to FIGS. 7A to 7C, and FIG. 8.

Figure 7A:
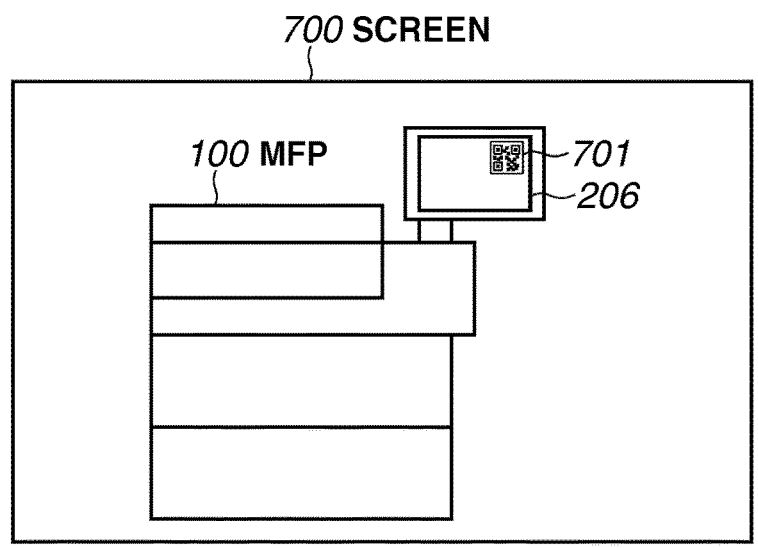
FIGS. 7A, 7B, and 7C are examples illustrating screens displayed on the display device according to the first exemplary embodiment of the present invention.
Figure 7B:
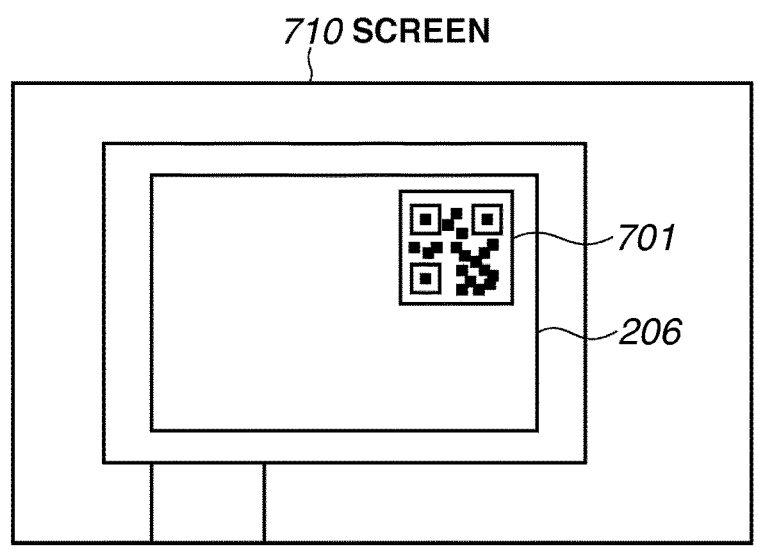
Figure 7C:
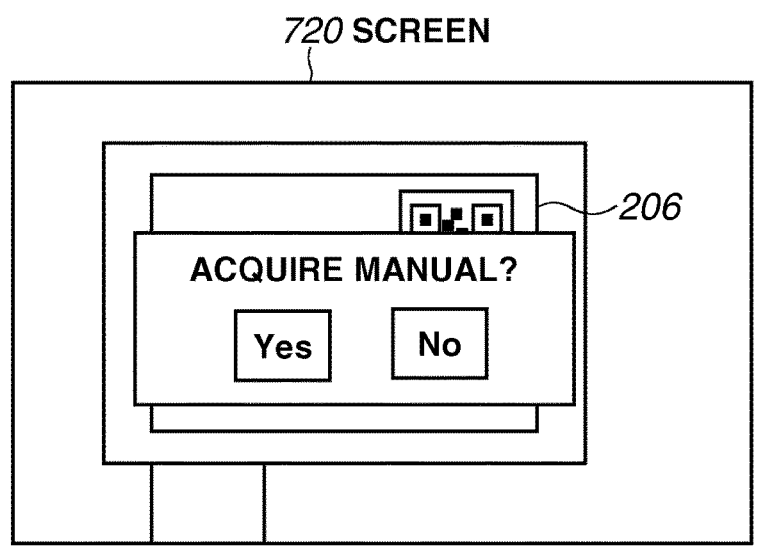

FIGS. 7A to 7C illustrate screens displayed on the touch panel 305 of the display device 101. A screen 700 illustrated in FIG. 7A displays the MFP 100 captured by the imaging unit 307. The display unit 206 of the MFP 100 displays various types of operation screens including the menu screen, the copy screen, and the error screen. Further, the display unit 206 displays a QR code 701 corresponding to each operation screen.

As illustrated in a screen 710, if the user brings the display device 101 closer to the display unit 206 so that the imaging unit 307 can recognize the QR code 701, the imaging unit 307 analyzes the QR code 701 and the display device 101 acquires the identification information included in the QR code 701. When the display device 101 acquires the identification information, as illustrated in a screen 720, the display device 101 inquires of the user whether to acquire the manual. When the user selects "YES" in the screen 720, the display device 101 notifies the server device 102 of the identification information acquired from the QR code 701 to acquire the manual corresponding to the MFP 100 from the server device 102. In order for the display device 101 to communicate with the server device 102, the display device 101 needs to specify the server device 102. The user may input information, an internet protocol (IP) address for example, for specifying the server device 102, via the touch panel 305 of the display device 101, or may acquire such information from the code image displayed on the display unit 206 of the MFP 100. Further, the IP address of the server device 102 may be previously set for the display device 101.

According to the present exemplary embodiment, when the identification information is acquired from the QR code 701, whether to acquire manual is inquired of the user, however, the manual may be automatically acquired, when the identification information is acquired, without inquiring of the user whether to acquire manual.

When the display device 101 acquires the manual from the server device 102, as illustrated in FIG. 8, the touch panel 305 of the display device 101 displays the manual.

A region 801 displays the acquired manual. Details will be described with reference to a flowchart illustrated in FIG. 9. The region 801 displays a page, from among all pages in the manual, specified by the identification information acquired from the QR code 701 as an initial screen. More specifically, when the display unit 206 of the MFP 100 displays the fax screen for using the fax, the QR code 701 includes "A-003" as the identification information corresponding to the fax screen. Since the display device 101 acquires the manual from the server device 102 using "A-003", the region 801 of the display device 101 displays as the initial screen a page related to the fax, not a head page in the manual. Thus, the user does not need to search a desired page from the entire manual, thereby improving convenience.

A region 802 displays information, other than the manual, such as buttons with which the user performs operation. The region 802 can be set to "non-display" when the user selects the button 804. When the region 802 is set to "non-display", since the region 801 can be displayed using the entire region of the touch panel 305, user's visuality can be improved.

A region 803 displays an image captured by the imaging unit 307. A button 805 updates the manual displayed in the region 801 using the QR code displayed in the region 803. A button 806 ends the display of the manual.

A region 807 displays predetermined number of pages in the manual being aligned. The user selects any page displayed in the region 807 to change the page displayed in the region 801 to the page selected in the region 807. A button 808 moves an area of the page displayed in the region 807 to right or to left. A button 809 enlarges/reduces the page displayed in the region 807.

Processing for displaying the manual of the MFP 100 on the display device 101 will be described with reference to the flowchart illustrated in FIG. 9. Steps S901 to S906 are processed when the CPU 301 included in the display device 101 loads a program stored in a memory such as the ROM 302 into the RAM 303 and executes the program.

In step S901, the CPU 301 determines whether the imaging unit 307 recognizes the QR code. When the CPU 301 determines that the imaging unit 307 recognizes the QR code (YES in step S901), the processing proceeds to step S902. On the other hand, when the CPU 301 determines that the imaging unit 307 does not recognize the QR code (NO in step S901), the CPU 301 waits until the imaging unit 307 recognizes the QR code.

In step S902, the CPU 301 analyzes the QR code to determine whether the identification information has been acquired from the QR code. When the CPU 301 determines that the identification information has been acquired from the QR code (YES in step S902), the processing proceeds to step S903. On the other hand, when the CPU 301 determines that the identification information has not been acquired from the QR code (NO in step S902), the processing returns to step S901.

In step S903, the CPU 301 determines whether to acquire the manual from the server device 102. More specifically, the CPU 301 inquires of the user the acquisition as illustrated in the screen 720 in FIG. 7C, and when the user selects "YES" (YES in step S903), the CPU 301 determines to acquire the manual, and then the processing proceeds to step S904. On the other hand, when the user selects "NO" (NO in step S903), the CPU 301 determines not to acquire the manual, and then the processing returns to step S901.

In step S904, the communication unit 306 notifies the server device 102 of the identification information acquired in step S902.

In step S905, the CPU 301 determines whether the manual and the page information have been received from the server device 102. Generally, the manual includes various information about functions and errors. Thus, to specify the page to be displayed on the touch panel 305 of the display device 101, the display device 101 receives the page information from the server device 102. In other words, the page information, which will be described in detail with reference to FIG. 11, specifies which page is to be displayed as the initial screen from among the all pages included in the manual. When the CPU 301 determines that the manual and the page information have been received from the server device 102 (YES in step S905), the processing proceeds to step S906. On the other hand, when the CPU 301 determines that the manual and the page information have not been received from the server device 102 (NO in step S905), the CPU 301 waits until the manual and the page information are received.

In step S906, based on the manual and the page information received in step S905, the touch panel 305 displays as the initial screen the page specified from among the all pages included in the manual. More specifically, as illustrated in the screen 800 in FIG. 8, the touch panel 305 displays as the initial screen the page corresponding to the identification information acquired from the QR code, which is the page corresponding to the operation screen displayed on the display unit 206 of the MFP 100.

Figure 10:
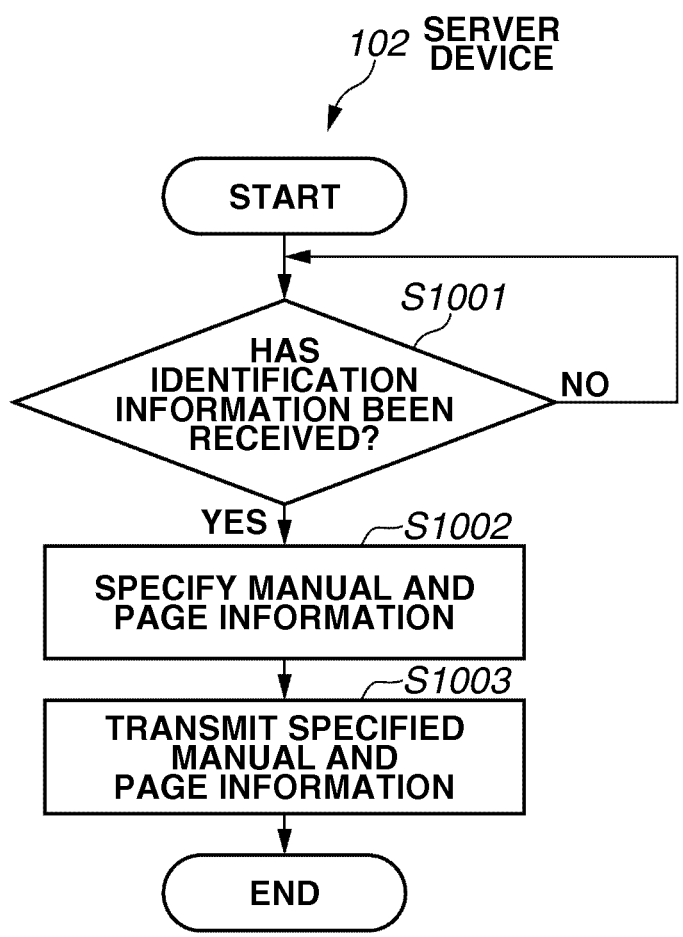
FIG. 10 is flowchart illustrating processing performed by the server device according to the first exemplary embodiment of the present invention.

Next, processing performed by the server device 102 will be described with reference to a flowchart illustrated in FIG. 10. Steps S1001 to S1003 are processed when the CPU 401 included in the server device 102 develops in the RAM 403 a program stored in the memory such as the ROM 402 and executes the program.

In step S1001, the CPU 401 determines whether the identification information notified by the display device 101 in step S904 illustrated in FIG. 9 has been received. When the CPU 401 determines that the identification information has been received (YES in step S1001), the processing proceeds to step S1002. On the other hand, when the CPU 401 determines that the identification information has not been received (NO in step S1001), the CPU 401 waits until the identification information is received.

In step S1002, based on the received identification information, the CPU 401 specifies the manual and the page information to be transmitted to the display device 101. At this point, the CPU 301 specifies the manual and the page information using a table 1100 stored in a ROM 402 or a HDD 404. The table 1100 will be described in detail with reference to FIG. 11.

In step S1003, the communication unit 405 of the server device 102 transmits the manual and the page information specified in step S1002 to the display device 101.

The table 1100 will be described with reference to FIG. 11. The server device 102 associates the identification information, the manual, and the page information with one another to manage them as the table 1100. More specifically, for example, the identification information "A-003" is associated with the manual "A_01.pdf" and the page information "100". FIGS. 6 and 8 have been used for the description, and the identification information "A-003" indicates the fax screen. The manual "A_01.pdf" indicates the manual including description of the fax function, and the page information "100" indicates a page number, among the all pages included in the manual of "A_01.pdf", at which the description of the fax function starts.

In the table 1100, the identification information of "A-001", that of "A-002", that of "A-004" and that of "A-003" indicate the same manual of "A_01.pdf", however the page information includes a value corresponding to each identification information. Further, since each of the identification information of "A-005" and that of "A-006" are identification information regarding an error, the manual is indicated to be "A_02.pdf". The table 1100 can manage various models of manuals in addition to the manual of the MFP of the specific model. In the table 1100, identification information of "B-001" and that of "B-002" specify the manual of an MFP of a different model from that of the MFP 100.

As described above, according to the present exemplary embodiment, the display device 101 receives the page information from the server device 102 in addition to the manual to be displayed, and then based on the page information, displays as the initial screen the specified page from among the all pages included in the manual. Therefore, the user of the display device 101 does not have to spend much time for searching the desired page from among all the pages included in the manual, thereby improving convenience.

Further, according to the present exemplary embodiment, the manual and the page information are stored in the server device 102. Even when the manual needs to be revised, or a manual of a new model needs to be added, the information included in the table 1100 of the server device 102 needs to be updated only. The configuration of the MFP 100 and that of the display device 101 do not need to be updated along with the revision of the manual. Thus, the time for managing the entire system can be reduced.

Furthermore, according to the present exemplary embodiment, the display device 101 acquires from the server device 102 the manual including the all pages in addition to the manual including only the pages specified by the identification information such as the pages describing the fax. With this arrangement, the user can also browse the manual describing other functions than the fax as necessary, thereby improving the convenience.

A second exemplary embodiment will be described. According to the first exemplary embodiment, when the display device 101 notifies the server device 102 of the identification information, the display device 101 receives both of the manual and the page information from the server device 102. However, according to the present exemplary embodiment, when the display device 101 does not need to receive the manual, it can receive only the page information.

Figure 12:
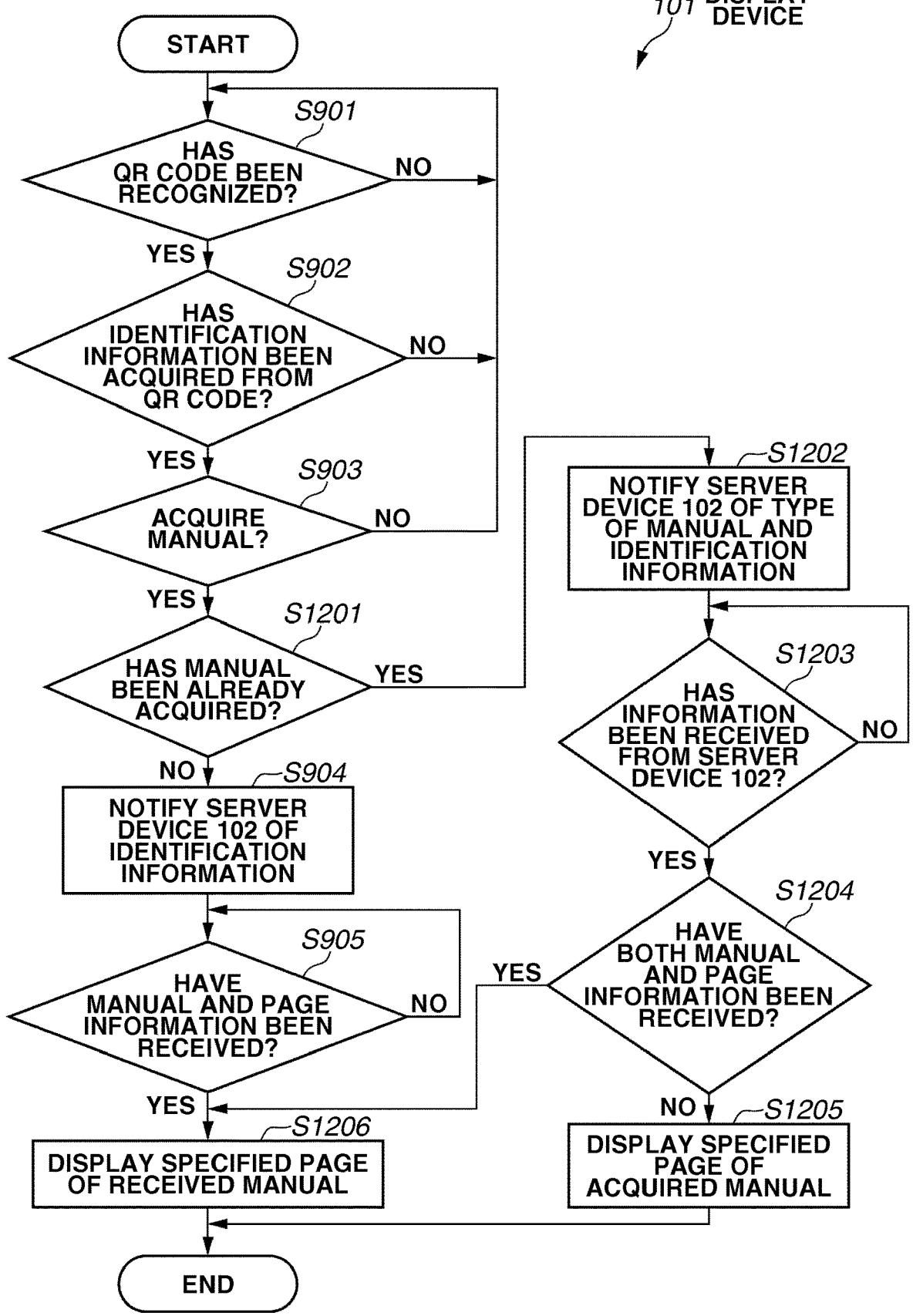
FIG. 12 is a flowchart illustrating processing performed by a display device according to a second exemplary embodiment of the present invention.

According to the present exemplary embodiment, the processing performed when the display device 101 displays the manual of the MFP 100 will be described with reference to a flowchart illustrated in FIG. 12. Steps S901 to S905 are similar to the steps in the flowchart illustrated in FIG. 9, and thus the description will not be repeated. Each step illustrated in FIG. 12 is processed when the CPU 301 included in the display device 101 develops in the RAM 303 a program stored in the memory such as the ROM 302 and executes the program.

In step S1201, the CPU 301 determines whether the touch panel 305 has already acquired a manual. When the touch panel 305 has acquired certain manual (YES in step S1201), the processing proceeds to step S1202. On the other hand, when the touch panel 305 has not acquired a manual (NO in step S1201), the processing proceeds to step S904 to perform the processing described with reference to FIG. 9.

In step S1202, the communication unit 306 of the display device 101 notifies the server device 102 of the identification information acquired in step S902 and the type of the manual (e.g., "A_01.pdf" that is a file name of the manual) acquired by the touch panel 305. In step S1203, the CPU 301 determines whether the information has been received from the server device 102. When the CPU 301 determines that the information has been received from the server device 102 (YES in step S1203), the processing proceeds to step S1204. On the other hand, when the CPU 301 determines that the information has not been received from the server device 102, the CPU 301 waits until the information is received.

In step S1204, the CPU 301 determines whether both of the manual and the page information have been received in step S1203. When the CPU 301 determines that both of the manual and the page information have been received (YES in step S1203), the processing proceeds to step S1206. Based on the received manual and page information, the touch panel 305 displays as the initial screen the page specified from among the all pages included in the manual. On the other hand, when the CPU 301 determines that only page information has been received in step S1203, the processing proceeds to step S1205.

In step S1205, the touch panel 305 displays the specific page specified by the received page information from among the all pages in the manual that has been already acquired. At this point, the touch panel 305 performs the display using the manual that has been already acquired. In other words, since a new manual does not need to be received, unnecessary communication does not have to be performed between the display device 101 and the server device 102.

Processing performed by the server device 102 will be described with reference to a flowchart illustrated in FIG. 13. Steps S1001 to S1003 are similar to the steps in the flowchart illustrated in FIG. 10, and thus the description will not be repeated. Each step illustrated in FIG. 13 is processed when the CPU 401 included in the server device 102 develops in the RAM 403 a program stored in the memory such as the ROM 402 and executes the programs.

In step S1301, the CPU 401 determines whether to transmit the manual specified in step S1002 to the display device 101. According to the present exemplary embodiment, when the type of the manual acquired by the display device 101 is notified in step S1202 illustrated in FIG. 12, the communication unit 405 of the server device 102 receives the type of the manual acquired by the display device 101. When the type of the received manual is identical to that of the manual specified in step S1002, the CPU 401 determines that the manual specified in step S1002 is not transmitted to the display device 101 (NO in step S1301), and then the processing proceeds to step S1302. On the other hand, when the type of the received manual is not identical to that of the manual specified in step S1002, the CPU 401 determines that the manual specified in step S1002 is transmitted to the display device 101 (YES in step S1301), and then the processing proceeds to step S1003.

In step S1302, the communication unit 405 of the server device 102 transmits the page information specified in step S1002 to the display device 101. At this point, the manual specified in step S1002 is not transmitted to the display device 101. Since the display device 101 has already acquired the manual specified in step S1002, the manual does not need to be transmitted.

As described above, according to the present exemplary embodiment, the manual that has been already acquired by the display device 101 can be avoided to be transmitted from the server device 102 to the display device 101. Accordingly, the unnecessary communication does not have to be performed between the display device 101 and the server device 102.

Other exemplary embodiment will be described. According to the first and second exemplary embodiments, the imaging unit 307 of the display device 101 reads the code image such as the QR code displayed via the display unit 206 of the MFP 100 to acquire the identification information, however, the embodiment to which the present invention is applied is not limited thereto. For example, the MFP 100 and the display device 101 may be communicably connected via the network such as a wireless local area network, and the identification information may be transmitted from the MFP 100 to the display device 101.

Further, according to the first and second exemplary embodiments, the MFP and the manual are described as an example of the information processing apparatus and the electronic file respectively, however, the embodiment to which the present invention is applied is not limited thereto. As other exemplary embodiments, for example, a television set may be adopted as the information processing apparatus to display the identification information indicating a product introduced in a TV program as the code image such as the QR code, and then the display device 101 may display a product catalog using the identification information read from the code image.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., a non-transitory computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

What is claimed is:

1. A method of an apparatus, a terminal and a server, the method comprising:
    storing identification information, and a manual having plural pages and information indicating a specific page in association with each other;
    transmitting the manual and the information indicating the specific page that correspond to the identification information which is received from the terminal;
    displaying a code image on a screen, wherein the code image is associated with the identification information for identifying the manual having plural pages and the information indicating the specific page;
    reading the identification information from the code image displayed on the screen;
    acquiring, from the server, the manual having plural pages and the information indicating the specific page of the manual, by transmitting the identification information read by the reading to the server; and
    displaying the specific page of the acquired manual based on the information indicating the specific page,
    wherein displaying the specific page initially displays the specific page of the plural pages of the acquired manual, and displaying a next page of the acquired manual upon reception of a user's page-shifting operation.

2. The method according to claim 1, further comprising determining whether any manual has already been acquired or not and, in a case where the manual has already been acquired, transmitting the information regarding the acquired manual and the identification information to the server,
    wherein, based on the acquired information, the server determines whether or not to transmit the manual identified by the identification information to the terminal.

3. The method according to claim 1, further comprising: changing the code image when a displayed screen is changed.

4. A system including an apparatus, a terminal and a server,
    wherein the server comprises:

a storage storing identification information, and a manual having plural pages and information indicating a specific page in association with each other; and at least a first processor and at least a first memory coupled to the at least first processor and having stored thereon instructions, when executed by the at least first processor, and cooperating to act as:

a transmitting unit configured to transmit the manual and the information indicating the specific page that correspond to the identification information which is received from the terminal, wherein the apparatus comprises:

at least a second processor and at least a second memory coupled to the at least second processor and having stored thereon instructions, when executed by the at least second processor, and cooperating to act as:

a first display control unit configured to display a code image on a screen, wherein the code image is associated with the identification information for identifying the manual having plural pages and the information indicating the specific page, wherein the terminal comprises:

at least a third processor and at least a third memory coupled to the at least third processor and having stored thereon instructions, when executed by the at least third processor, and cooperating to act as:

a reading unit configured to read the identification information from the code image displayed on the screen;

an acquisition unit configured to acquire, from the server, the manual having plural pages and the information indicating the specific page of the manual, by transmitting the identification information read by the reading unit to the server; and a second display control unit configured to display the specific page of the acquired manual based on the information indicating the specific page, and wherein the second display control unit initially displays the specific page of the plural pages of the acquired manual, and displays a next page of the acquired manual upon reception of a user's page-shifting operation.

5. The system according to claim 4, wherein the code image is a Quick Response (QR) code.

6. The system according to claim 4, wherein the reading unit is a camera.

7. The system according to claim 4, wherein the second display control unit is configured to display a list of a plurality of pages in the acquired manual received from the server.

8. The system according to claim 1, wherein the terminal further comprises a determination unit configured to determine whether the manual has already been acquired, in a case where it is determined by the determination unit that the manual has already been acquired, transmits the information regarding the acquired manual and the identification information read by the reading unit to the server, and wherein, based on the information acquired from the terminal, the server determines whether or not to transmit the manual identified by the identification information to the terminal.

9. The system according to claim 4, wherein the apparatus further comprises:

a change unit configured to change the code image when a displayed screen is changed.

10. The system according to claim 4, wherein the acquired manual is a manual related to the screen.

11. The system according to claim 4, wherein the specific page is a page related to the screen.

12. The system according to claim 4, wherein the manual is a PDF file.

13. The system according to claim 4, wherein the apparatus has a plurality of functions including at least one of a copy function and a scan function.

14. The system according to claim 1, wherein the storage stores plural manuals having plural pages, and the transmitting unit changes the manual to be transmitted based on the received identification information.

* * * * *